US008831663B2

(12) United States Patent
Fumarolo et al.

(10) Patent No.: US 8,831,663 B2
(45) Date of Patent: Sep. 9, 2014

(54) METHOD AND APPARATUS FOR INFORMING A DISPATCHER OF CONVENTIONAL TRAFFIC IN A DIFFERENT AND CONFLICTING TALKGROUP

(75) Inventors: Arthur L. Fumarolo, Schaumburg, IL (US); Daniel J. McDonald, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 157 days.

(21) Appl. No.: 13/590,374

(22) Filed: Aug. 21, 2012

(65) Prior Publication Data

US 2014/0057671 A1  Feb. 27, 2014

(51) Int. Cl.
*H04B 7/00* (2006.01)
(52) U.S. Cl.
USPC .......................................................... 455/518
(58) Field of Classification Search
CPC ............................... H04W 48/06; H04W 48/08
USPC ...................... 455/41.1, 518, 519, 63.1, 67.13
See application file for complete search history.

(56) References Cited

U.S. PATENT DOCUMENTS

2005/0037794 A1   2/2005   Namm et al.
2010/0167774 A1   7/2010   Kuehner et al.

OTHER PUBLICATIONS

International Search Report and Written Opinion for counterpart International Patent Application No. PCT/US2013/053171 mailed Nov. 18, 2013.

*Primary Examiner* — Eugene Yun
(74) *Attorney, Agent, or Firm* — Daniel R. Bestor; Kenneth A. Haas

(57) ABSTRACT

A method for providing an indicator to a dispatcher of traffic on a shared multi-talkgroup channel is provided. The method includes initiating and transmitting a first communication on a first talkgroup over the multi-talkgroup channel, receiving a notification at a first dispatch console indicating a presence of traffic on the multi-talkgroup channel that will conflict with a second talkgroup during the first communication, wherein the first dispatch console is subscribed to participate in the second talkgroup on the multi-talkgroup channel, and generating an indicator at the first dispatch console indicating to a dispatcher the presence of traffic on the multi-talkgroup channel that will conflict with the second talkgroup during the first communication.

22 Claims, 7 Drawing Sheets

METHOD AND APPARATUS FOR INFORMING A DISPATCHER OF CONVENTIONAL TRAFFIC IN A DIFFERENT AND CONFLICTING TALKGROUP

FIELD OF THE DISCLOSURE

The present disclosure relates generally to a method and apparatus for informing a dispatcher of conventional traffic and more particularly to a method and apparatus for indicating to a dispatch console the presence of conflicting traffic on a talkgroup on a multi-talkgroup channel during a communication.

BACKGROUND

Communication systems typically comprise a plurality of dispatch consoles and communication units, such as mobile or portable radio units, that are geographically distributed among various base sites and console sites. The communication units wirelessly communicate with the dispatch consoles and each other via repeaters. The repeaters receive transmissions from the communication unit and wirelessly retransmit them to the other communication units or retransmit them by wire to the dispatch consoles. The communication units and dispatch consoles are often logically divided into various talkgroups. Communication systems may be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a controller/server (sometimes called a "zone controller") for allocating RF communication resources among a group of sites. The zone controller may reside within a single device, or multiple devices, and may be located at a fixed equipment site or may be distributed among the base sites.

Calls among the communication units are typically of the dispatch type, or better known as push-to-talk (PTT). Each time a communication unit is keyed to begin a call, the call is assigned to an available wireless RF channel. The originating communication unit begins transmitting on the assigned RF channel and continues to transmit on the assigned RF channel until the communication unit has been dekeyed by the user. Other communication units in an associated talkgroup also begin listening to the call. Each RF channel may have a pair of frequencies associated with it, an outgoing frequency and an incoming frequency. All communications transmitted by the communication units are made on the incoming frequency. All communications originating from a dispatch console or being wirelessly retransmitted by the repeater are made on the outgoing frequency. In other examples, incoming and outgoing channels may be accessed by time (TDMA) or code (CDMA).

In current communication systems, there is often a need to support multiple talkgroups on a single RF channel. As a result, it becomes a challenge to manage multiple users all on a single RF channel, including some users in the same or different talkgroups, since it often requires interrupting one communication with another communication or waiting for one to finish before starting another. When the communication units are at different sites, the network may be reconfigured to allow audio from an interrupting communication unit to be the source of the call. If the interrupting communication unit is at the same base site as the communication unit being interrupted, one of three outcomes may occur based on the RF characteristics of the system: 1) the transmission from the interrupted communication unit is heard as opposed to the interrupting communication unit, 2) the transmission from the interrupting communication unit is heard as opposed to the interrupted communication unit or 3) the transmissions from the two communication units interfere with each other, and no audio is heard. As a result, some current communication systems have been modified so as to allow only one communication unit at a time to transmit a communication while requiring other communication units to provide users with an indication that a communication is being transmitted and that they cannot currently transmit a communication.

Accordingly, many current communications do not have an effective way of dealing with overlapping communications of different talkgroups on the same multi-talkgroup channel. Current communication systems do not adequately make provisions for interactions between dispatch-console-initiated transmissions and subscriber-initiated transmissions on different talkgroups all using the same multi-talkgroup channel. Some current communication systems, as discussed above, may prevent all transmissions on a channel, without regard to user group separation, when any communication unit or dispatch console is transmitting a communication. However, there is little flexibility in the communication system for effectively managing overlapping communications from multiple talkgroups on the same multi-talkgroup channel.

For example, in the case of a single multi-talkgroup channel partitioned into a Talkgroup A and a Talkgroup B, it is possible that a dispatcher could initiate a voice transmission or communication on Talkgroup A, without realizing that there is already traffic on the multi-talkgroup channel from Talkgroup B. As used herein, the term "traffic" refers to any ongoing communications being transmitted on a channel, such as by the dispatcher on a dispatch console or a user on a communication device. The interaction of different communications on different talkgroups (Talkgroups A and B) on a conventional channel could result in behavior that is unanticipated by the dispatcher. This behavior could occur unknowingly to the dispatcher if his/her particular dispatch console is not subscribed to transmit and/or receive traffic in, or subscribed to participate in, the talkgroup that is currently using the channel. For example, the dispatcher, while on Talkgroup A, would not necessarily be able to hear any audio or communication on Talkgroup B which would conflict with her transmission on Talkgroup A. This scenario is likely to occur in a communication system that shares a single multi-talkgroup channel amongst users in multiple agencies. In that case, the dispatch console would likely be subscribed to participate in only the talkgroup or talkgroups on the multi-talkgroup channel pertinent to that dispatch console's users or agency, and not talkgroups being used by a sharing agency or other users.

Accordingly, there is a need for an improved method and apparatus for informing a dispatcher of conventional traffic in different talkgroups all using a single multi-talkgroup channel.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
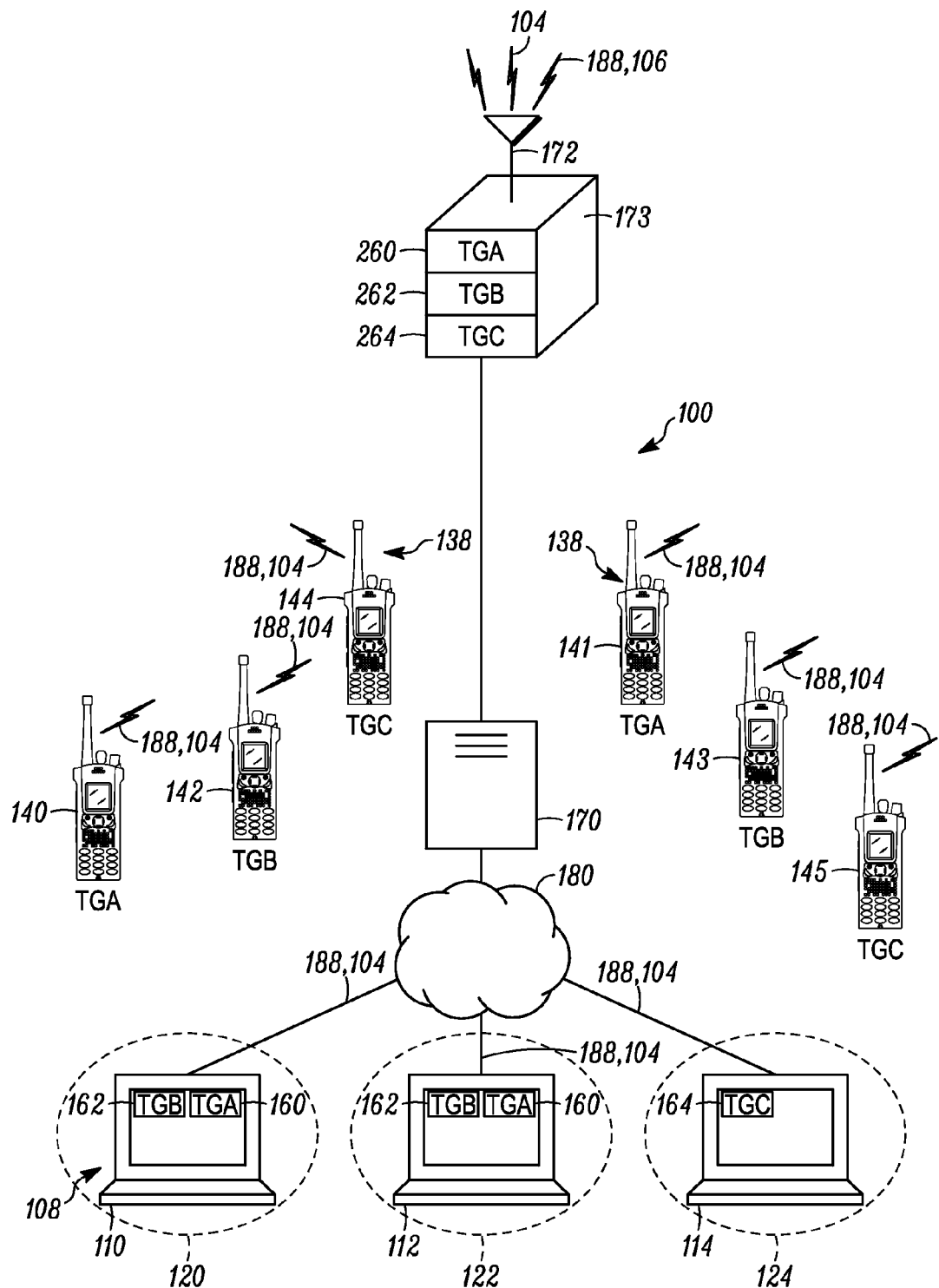
FIG. 1 is a schematic block diagram of a communication system for transmitting communications on a multi-talkgroup channel in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Methods and devices consistent with the present disclosure overcome the disadvantages of conventional communication systems by providing a method for providing an indicator to a dispatcher of traffic on a multi-talkgroup channel, the method includes initiating and transmitting a first communication in a first talkgroup on the multi-talkgroup channel, receiving a notification indicating a presence of traffic on the multi-talkgroup channel that will conflict with a second talkgroup during the first communication, wherein the first dispatch console is subscribed to participate in the second talkgroup on the multi-talkgroup channel, and generating an indicator at the first dispatch console indicating to a dispatcher the presence of traffic on the multi-talkgroup channel that will conflict with a second talkgroup during the first communication.

FIG. 1 is a schematic block diagram of communication system 100 for transmitting communications 188 on a multi-talkgroup channel 106. Communication system 100 preferably comprises a zone controller 170 for sending and receiving communications 188 on the multi-talkgroup channel 106 to any other communication device within the communication system 100 including, for example, a dispatch console 108 or a communication unit 138. Communication units 138 (including communication units 140-145) may be geographically distributed and dispatch consoles 108 (including dispatch consoles 110-114) may be geographically distributed among various console sites 120, 122, and 124. Preferably, the communication units 138 wirelessly communicate with the dispatch consoles 108 and each other via repeater 173. The repeater 173 receives transmissions from the communication units 138 and wirelessly retransmits them to the other communication units 138 and/or retransmits them by wire to the dispatch consoles 108. The communication units 138 and dispatch consoles 108 are often logically divided into various talkgroups, such as first, second and third talkgroups TGA 260, TGB 262, and TGC 264. Each dispatch console 108 may display one or more talkgroup sessions 160, 162, 164, whereby each talkgroup sessions 160, 162, 164 may display the status of a corresponding talkgroup, such as whether a communication 188 is active within a given talkgroup, and what type of communication 188 is active within the talkgroup, such as an emergency communication or a dispatch-console-initiated communication.

Communication system 100 may be organized as a conventional or non-trunked system where RF communication resources are dedicated to one or more users or groups. Zone controller 170 is a controller or computer server used for allocating RF communication resources among a group of sites. The zone controller 170 is connected with at least one repeater 173 and may receive wireless communications 188 from communication units 138 via at least one antenna 172 on the repeater 173 and may receive wired communications 188 from dispatch consoles 108 via a network 180. The zone controller 170 may reside within a single device, or multiple devices, and may be located at a fixed equipment site. Communication system 100 may support multiple talkgroups TGA 260, TGB 262, and TGC 264 each having multiple communication units 140 and 141, 142 and 143, and 144 and 145, respectively. Preferably, the zone controller 170 notifies dispatch consoles 108 of activity, such as communications 188 or traffic 104, for talkgroups on multi-talkgroup channel 106.

Figure 2:
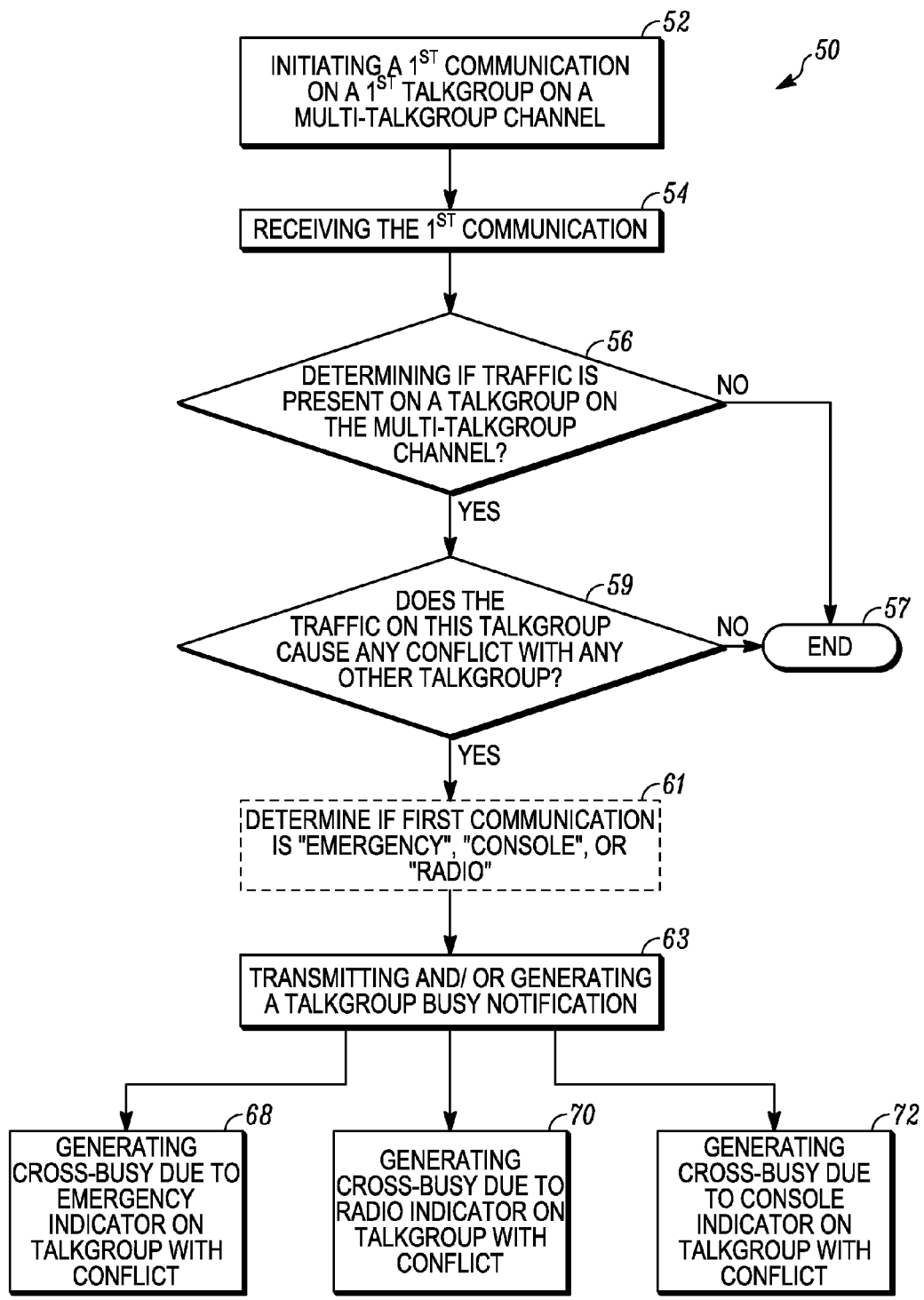
FIG. 2 is a flowchart of a method for dispatcher notification of traffic on a multi-talkgroup channel in accordance with some embodiments.

With reference to FIG. 2, a flowchart illustration of a method 50 for dispatcher notification of traffic 104 on a multi-talkgroup channel 106 is provided. The method is initiated at block 52, whereupon a communication 188, such as a first communication, is initiated in a first talkgroup TGA 260 on a multi-talkgroup channel 106. Communication 188 includes any transmission of information between any communication devices on the multi-talkgroup channel 106. Communication 188 results in traffic 104, which is a wireless transmission of information, on the multi-talkgroup channel 106. Traffic 104 may include more than one communication 188. Communications 188 may be initiated by any dispatch console 108 or any communication unit 138, and may be flagged as emergency communications or non-emergency communications, among other possibilities. If traffic 104 on any talkgroup causes a conflict with any talkgroup subscribed to participate in by a dispatch console 108, then a notification may be generated which is then transmitted to and used by a dispatch console 108 to generate, and preferably display, an indicator regarding a potential conflict. Traffic 104 on any talkgroup causes a conflict with a subscribed talkgroup when that traffic 104 is transmitted on the same multi-talkgroup channel 106 as used by another subscribed talkgroup. Indicators are generated by dispatch consoles 108 upon receiving or generating a notification, and may be anything that can indicate or communicate information to a user, such as visual indicators displayed on a display of a dispatch console 108, audio indicators broadcast over speakers on or near a dispatch console, and mechanical or vibratory indicators generated by mechanical devices or vibrating members.

Notifications may be generated by any system device that transmits or receives a communication 188 that traverses the multi-talkgroup channel 106, such as a dispatch console 108, a communication unit 138, or a zone controller 170, and then may be received or processed at a dispatch console 108, which can then, based upon the notification, generate an indicator.

Preferably, multi-talkgroup channel 106 supports more than one talkgroup, such as the first talkgroup TGA 260, the second talkgroup TGB 262, and the third talkgroup TGC 264, on a single RF channel, as shown in FIG. 1. The first communication may be initiated by a user from any communication device communicating within the first talkgroup TGA 260 on the multi-talkgroup channel 106, such as a communication unit 138 or a dispatch console 108.

In one embodiment, a first communication is initiated by a user from a first dispatch console 110 subscribed to communicate on the first talkgroup TGA 260. However, the first communication may also be initiated by a user from a first communication unit 140 subscribed to communicate on the first talkgroup TGA 260. Either way, the first communication is initiated on the first talkgroup TGA 260.

Upon initiating the first communication, the first communication is transmitted from the communication device upon which it is initiated on to another system device which can receive the communication, such as the zone controller 170. The zone controller 170 receives communications 188 initiated and transmitted by communication devices on the multi-talkgroup channel 106 for a given talkgroup, such as communication units 138 and dispatch consoles 108, and then causes those communications to be rebroadcast to other communication devices that are subscribed to the same talkgroup, including communication devices 138 on the multi-talkgroup channel 106 and dispatch consoles 108, as shown in FIG. 1. The zone controller 170 is preferably connected via a wired connection to dispatch consoles 108, and via at least one wireless radio connection to communication units 138 on the multi-talkgroup channel 106, as shown in FIG. 1. In the example set forth in FIG. 1, the zone controller 170 is connected with communication units 138 via repeater 173 and connected with dispatch consoles 108 via a network 180.

With reference to FIG. 2, at block 54 the first communication is then received by other system device(s) in the communication system 100, including perhaps other communication units 138 and/or other dispatch consoles 108 subscribed to the same talkgroup (TGA). Then at block 56 a determination is made by one of the zone controller and the device receiving the first communication (e.g., a dispatch console or a communication unit) as to if the traffic is present on a talkgroup on the multi-talkgroup channel 106. If the traffic 104 is not present on a talkgroup on the multi-talkgroup channel 106, then the method 50 moves to block 57 and ends.

If the traffic 104 is present on a talkgroup on the multi-talkgroup channel 106, then a notification indicating that the traffic is present on a talkgroup on the multi-talkgroup channel 106 is generated by the receiving device, and a determination is made at the zone controller or receiving device as to whether or not the traffic 104 on the current talkgroup may cause any conflict with any other talkgroup on the multi-talkgroup channel 106, at block 59. Preferably, a centralized database is accessed which cross-references each talkgroups and the respective multi-talkgroup channel being used by each talkgroup in the communications system 100 such that the database can be used to determine which other talkgroups share the same multi-talkgroup channel as the multi-talkgroup channel being used for the current traffic 104. The centralized database is accessible by any system device. In one embodiment, the centralized database is a cross-busy database which retains cross-busy information indicating the conflicts between talkgroups using a same multi-talkgroup channel when traffic is present on one of them. In one embodiment, the cross-busy information may be encoded in the notification indicating that traffic is present on a talkgroup on the multi-talkgroup channel 106 or in another signal received by a system device, such as the dispatch console. In one embodiment, the dispatch consoles 108 are configured to register their configured cross-busy associations to another system device in the communications system 100, such as the zone controller 170, prior to receiving any notifications from the another system device as a function of the provided cross-busy associations. The configured cross-busy association for a dispatch console may include information as to each talkgroup in which that dispatch console 108 is subscribed to participate in, and/or may explicitly set forth known conflicting talkgroups. In one embodiment, the cross-busy database may be stored at the zone controller 170. In another embodiment, the cross-busy database may be stored at one or each of the dispatch consoles 108. Other possibilities exist as well.

If it is determined that the traffic 104 on the current talkgroup is causing any conflict with any other talkgroup on the multi-talkgroup channel 106 which is being subscribed to, then the method 50 moves to block 61, if it is determined that the traffic 104 on the current talkgroup is not causing any conflict with any other talkgroup on the multi-talkgroup channel 106 which is being subscribed to, then the method 50 moves to block 57 and ends.

If it is determined that traffic 104 is present, and that the traffic 104 on, for example TGA, causes any conflict with any other talkgroup on the multi-talkgroup channel 106, then at optional block 61 a further determination is made as to whether the traffic 104 on the multi-talkgroup channel 106 is dispatch-console-initiated (i.e. initiated by a dispatch console 108) or communication unit initiated (i.e. initiated by a communication unit 138) or if the traffic 104 is emergency traffic 104. Upon making the determination as to what type of traffic 104 is being received, the method then moves to block 63, whereupon a talkgroup busy notification is generated. The talkgroup busy notification indicates that traffic 104 due to the first communication is present on the multi-talkgroup channel 106, and specifically, on the first talkgroup TGA 260. In some embodiments, the talkgroup busy notification contains specific information as to the source and the type of traffic 104 present on the multi-talkgroup channel 106. For example, the talkgroup busy notification may indicate that the traffic 104 present is from the first talkgroup TGA 260 and that the traffic 104 present is a console initiated communication.

The talkgroup busy notification may be generated by any system device communicating over or subscribed to participate in the first talkgroup TGA 260, including any dispatch console 108, any communication unit 138, or any zone controller 170. In one example, the talkgroup busy notification may be generated by another system device, such as a zone controller 170 or communication unit 138, and then transmitted to a dispatch console 108. In another example, the talkgroup busy notification may be generated internally at a dispatch console 108 due to reception or transmission of traffic on a talkgroup at that dispatch console determined, by the dispatch console, to conflict with another talkgroup that the dispatch console is also subscribed to. In still another example, the talkgroup busy notification may be generated internally at a dispatch console 108 due to reception or transmission of traffic on a talkgroup at that dispatch console and transmitted to another dispatch console known to be subscribed to a conflicting talkgroup. Other examples are possible as well.

In one embodiment, the zone controller 170 merely informs the dispatch console 108 of traffic 104 on the multi-talkgroup channel 106, and then the dispatch console 108 derives on its own the fact that an indicator needs to be generated, and then generates an indicator, such as a first or second console busy indicator 200 or 201, a cross-busy due to console indicator 202, an inbound radio call indicator 205, inbound radio call indicator 205, and a cross-busy due to radio indicator 206, or an emergency indicator 207. In another embodiment, the zone controller 170 provides talkgroup audio to a subscribed dispatch console (including initial and/or embedded information identifying the talkgroup target of the audio) and relies upon that dispatch console to determine conflicting talkgroups and display corresponding indicators. In still another embodiment, the zone controller 170 provides talkgroup audio to the subscribed dispatch console and also provides a separate talkgroup busy notification to the dispatch console indicating conflicting talkgroups.

In one embodiment, at block 72, if the traffic 104 is dispatch-console initiated, then an indicator is generated at respective dispatch consoles 108 that dispatch-console-initiated traffic is present on the multi-talkgroup channel 106, such as a cross-busy due to console notification. Preferably, any device receiving the first communication is at least temporarily restrained from transmitting further communications on the multi-talkgroup channel 106. In one embodiment, if the traffic 104 is dispatch-console initiated, any other dispatch console 108 wanting to initiate a communication, such as second dispatch console 112 or third dispatch console 114, may be prevented from transmitting and/or instead placed in a queue in view of the talkgroup busy information.

In one embodiment, at block 70, if the traffic 104 is communication-unit initiated, then an indicator is generated at respective dispatch consoles 108 that communication-unit initiated traffic is present on the multi-talkgroup channel 106, such as a cross-busy due to radio indicator.

In one embodiment, at block 68, if the traffic 104 is emergency traffic 104, then an indicator is generated by the device receiving the first communication, that emergency traffic is present on the multi-talkgroup channel 106 such as a cross-busy due to emergency notification. Emergency traffic 104 includes communications 188 which are initiated by a dispatch console 108 or a communication unit 138 and flagged as emergency communications, that is, a communication flagged by the user as a communication of high importance. In some embodiments, any device, including dispatch consoles, receiving the notification that emergency traffic is present on the multi-talkgroup channel 106 is prevented from transmitting any additional communication on the multi-talkgroup channel 106 so long as emergency traffic 104 is present on the multi-talkgroup channel 106.

Figure 3:
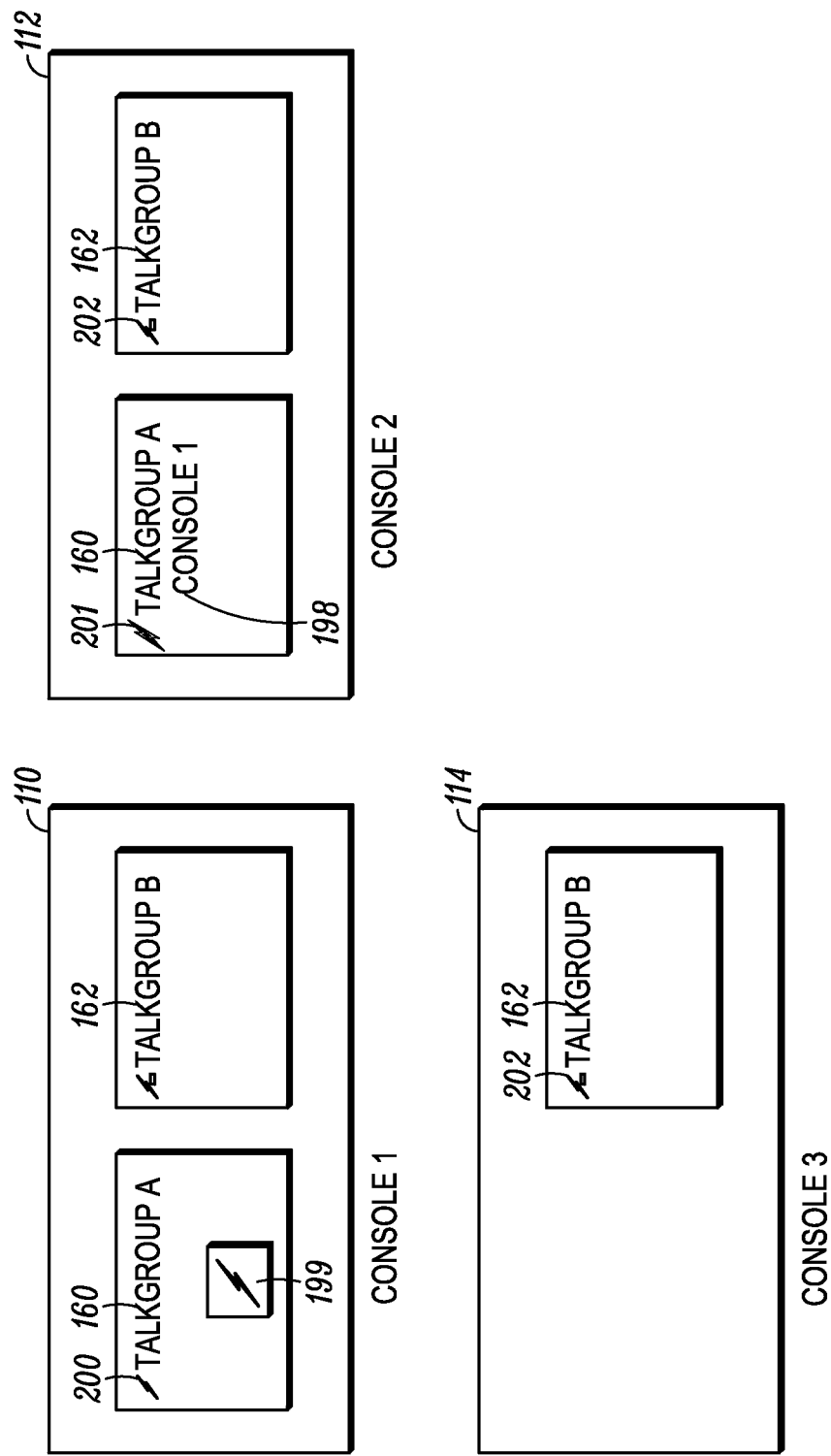
FIGS. 3-7 illustrate various instances of information being displayed on displays for first, second, and third dispatch consoles in various states of transmitting or receiving communications on a multi-talkgroup channel in accordance with some embodiments.

In one embodiment and with reference to FIG. 3, a corresponding indicator is displayed at respective dispatch consoles in accordance with the notification. A talkgroup busy notification received by or generated at a dispatch console 108 causes the respective dispatch console to display either first or second console busy indicator 200 or 201, or a cross-busy due to console indicator 202, depending on the contents of the notification. In one embodiment, the first console busy indicator 200 is generated by any dispatch console 108 from which a communication 188 is currently being transmitted from, such as the first dispatch console 110. In one embodiment, the second console busy indicator 201 is generated by any dispatch console 108 which is subscribed to a talkgroup, such as a first talkgroup TGA 260, on which a communication 188, such as the first communication, is currently being transmitted on, as shown in FIG. 3. In one embodiment the console busy indicator is a cross-busy due to console indicator 202 generated by any dispatch console 108 subscribed to a talkgroup other than a talkgroup which has generated the traffic 104 and which conflicts with the talkgroup which has generated the traffic 104. In one embodiment the console busy indicator is a cross-busy due to emergency indication 207 generated by any dispatch console 108 configured to communicate with a talkgroup other than a talkgroup which has generated the traffic 104 and which conflicts with the talkgroup which has generated the traffic 104, when the traffic 104 is emergency traffic generated on the multi-talkgroup channel 106. In one embodiment, the console busy indicator is a cross-busy due to radio indicator 206 which is generated by any dispatch console 108 configured to communicate with a talkgroup other than the talkgroup which has generated the traffic 104 and which conflicts with the talkgroup which has generated the traffic 104, when traffic 104 is generated by a communication unit 138 on the multi-talkgroup channel 106.

In one embodiment, the communication device which generated the first communication, such as the first dispatch console 110, is placed in a queue when conflicting traffic is already present on the multi-talkgroup channel 106, preferably by the zone controller 170. In one embodiment, the communication device which generated the first communication is provided with an option to override any traffic 104 present on the multi-talkgroup channel 106 and transmit the first communication to communication devices on the multi-talkgroup channel 106. Preferably, the option to override traffic 104 present on the multi-talkgroup channel 106 depends on the type of traffic 104 present. For example, if the existing conflicting traffic is initiated by a communication unit 138 and the first communication is initiated by a dispatch console 108, then the dispatch console 108 may be provided with the option to override the existing conflicting traffic. However, if the existing conflicting traffic is initiated by a dispatch console 108 and the first communication is initiated by a communication unit 138 or another dispatch console 108, then the communication unit 138 or dispatch console 108 which initiated the first communication may not be provided with the option to override the existing conflicting traffic initiated by a dispatch console 108.

With reference to FIG. 3, in one embodiment, the first communication is a dispatch-console-initiated communication initiated from first dispatch console 110 on a first talkgroup TGA 260. In this embodiment, a cross-busy due to console talkgroup busy indictor 202 is displayed, preferably by each dispatch console 108 that is subscribed to a conflicting talkgroup, to indicate that the multi-talkgroup channel 106 is busy at the moment due to a dispatch-console-initiated communication. In addition, the communication device from which the first communication is initiated from, first dispatch console 110, generates a first type of console busy indicator 200, preferably by displaying the indicator 200 in or around the first talkgroup session 160. The remaining dispatch consoles generate a second type of console busy indicator 201 if they are subscribed to participate in the talkgroup on which the first communication was generated (e.g., TGA 260), including for example the second dispatch console 112. Preferably, the second type of indicator 201 is displayed in or around the first talkgroup session 160 subscribed to by any other dispatch console 108. Some dispatch consoles generate a third type of cross-busy due to console indicator 202 if they are not subscribed to participate in the talkgroup from which the first communication was generated, but yet, they are subscribed to conflicting talkgroups that operate on the same multi-talkgroup channel 106 as the talkgroup on which the first communication was generated (e.g., TGA 260),. Preferably, the third type of indicator 202 is displayed in or around any remaining talkgroup sessions (other than the talkgroup session from which the first communication was initiated from) such as second talkgroup session 162 (Talkgroup B). The third type of indicator 202 is a cross-busy due to console indicator 202 which indicates to any console 110, 112, 114 subscribed to participate in a talkgroup other than the one in which the first communication is being transmitted on and that is determined to conflict with the one in which the first communication is being transmitted on, that traffic 104 originated by a dispatch console 108 is present on the multi-talkgroup channel 106. In this manner, the cross-busy due to console indicator indicates to the second dispatch console 112 and the third dispatch console 114 that conflicting traffic from another dispatch console 108 (first dispatch console 110) is present on the multi-talkgroup channel 106.

Preferably, in addition to the second type of console busy indicator 201, the identity 198 of the dispatch console 108 from which the first communication was initiated from, e.g., the first dispatch console 110 "Console 1," may be generated, preferably by displaying identity 198 in or around the first talkgroup session 160.

Preferably, the first or second dispatch console 110 or 112 is configured to subscribe to participate in a second talkgroup, such as talkgroup TGB 262. Preferably, the third type of indicator 202, also known as the cross-busy due to console indicator 202, indicates to any dispatcher on a dispatch console 108 displaying the indicator that traffic 104 originated by a dispatch console 108 is currently present on the multi-talkgroup channel 106 and that if other talkgroups, such as the second talkgroup TGB 262, initiate and transmit a second communication on the multi-talkgroup channel 106, a conflict would occur. Preferably, in one embodiment, the second dispatch console 112 is configured to subscribe to participate in the first talkgroup TGA 260 and has a first talkgroup session 160 currently active, and preferably, the talkgroup busy notification transmitted to the second dispatch console 112 includes indication that traffic 104 is present in the first talkgroup TGA 260. Preferably, the second dispatch console 112 then generates a second type of console busy indicator 201 for the first talkgroup session 160 of the second dispatch console 112. In another embodiment, the talkgroup busy notification could be generated internally at the second dispatch console in response to receiving the media (audio and/or video) for subscribed talkgroup TGA.

In one embodiment, the second dispatch console 112 is configured to subscribe to participate in the first talkgroup TGA 260, and the talkgroup busy notification transmitted to or generated by the second dispatch console 112 indicates that traffic 104 is present in the first talkgroup TGA 260 from the first dispatch console 110, such as by displaying a name 198 in or around the first talkgroup session 160 of the second dispatch console 112.

In one embodiment, the second dispatch console 112 is configured to subscribe to participate in a second talkgroup TGB 262, whereby the second talkgroup TGB 262 is operating on the same multi-talkgroup channel 106 as TGA 260, and whereby the talkgroup busy notification transmitted to or generated by the second dispatch console 112 indicates that the traffic 104 present on the multi-talkgroup channel 106 also conflicts with TGB 262, preferably causing the second dispatch console 111 to display a cross-busy due to console indicator 202 for the second talkgroup session 162. In one embodiment, the third console 114 is configured to subscribe to participate in the second talkgroup TGB 262 alone, whereby the second talkgroup TGB 262 is operating on the same multi-talkgroup channel 106 as TGA 260, and whereby the talkgroup busy notification transmitted to or generated by the third dispatch console 114 indicates that traffic 104 is present on the multi-talkgroup channel 106 conflicts with TGB 262, preferably causing the third dispatch console 114 to display a cross-busy due to console indicator 202 for the second talkgroup session 162.

Figure 4:
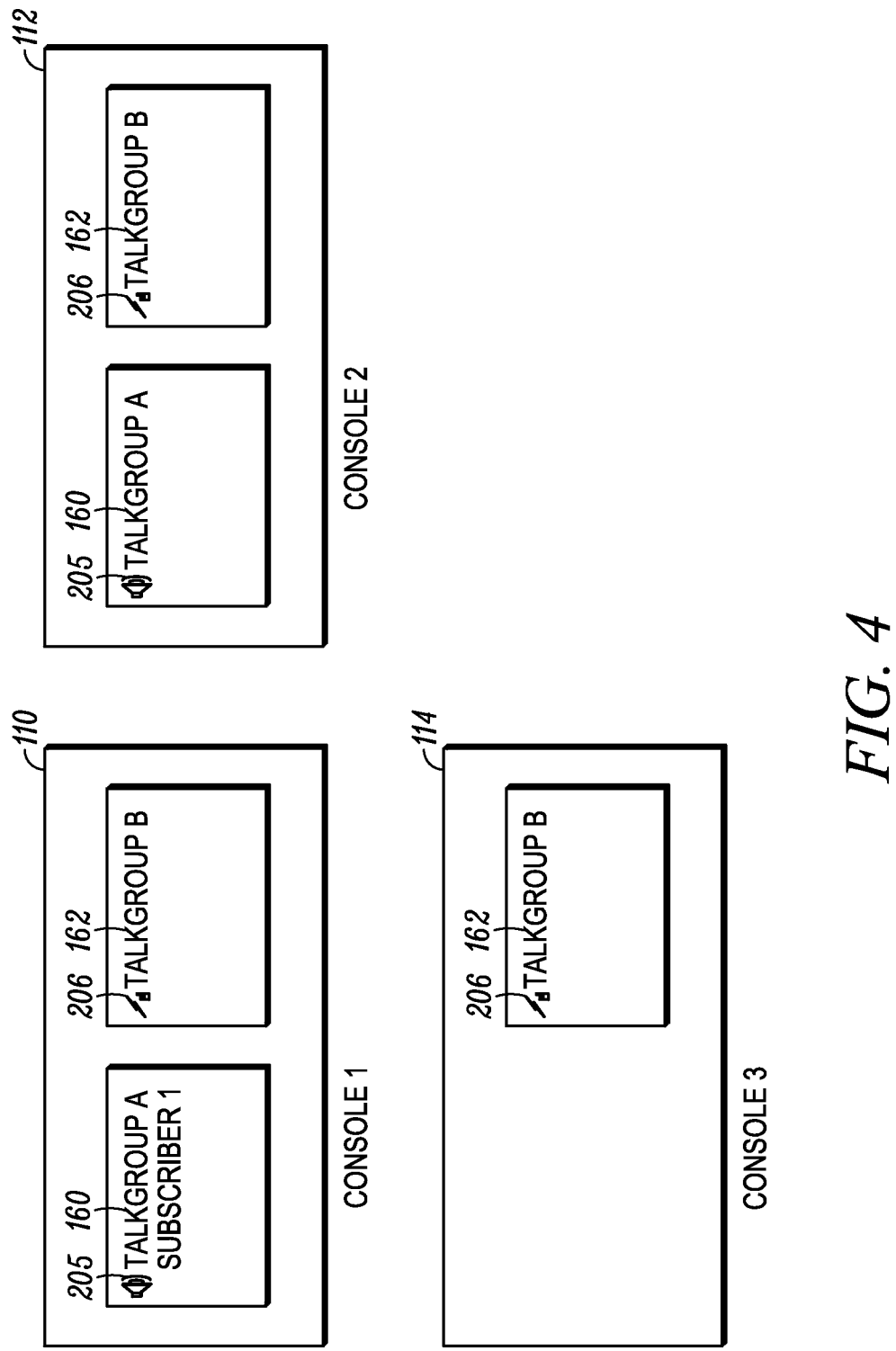

With reference to FIG. 4, if a communication unit initiated communication is present on the first talkgroup TGA 260 of the multi-talkgroup channel 106, then a cross-busy due to radio talkgroup busy notification is generated by or transmitted to dispatch consoles 108 to indicate that the multi-talkgroup channel 106 is busy at the moment due to a communication-unit initiated communication. Upon receiving the cross-busy due to radio talkgroup busy notification, the respective dispatch consoles 108 generate an inbound radio call indicator 205 for the first talkgroup session 160 and a cross-busy due to radio indicator 206 for any remaining conflicting talkgroup sessions, such as second talkgroup session 162, on the multi-talkgroup channel 106. The cross-busy due to radio indicator 206 indicates that a communication-unit initiated communication is present on the multi-talkgroup channel 106 that conflicts with the talkgroup session 162 associated with the indicator 206.

Figure 5:
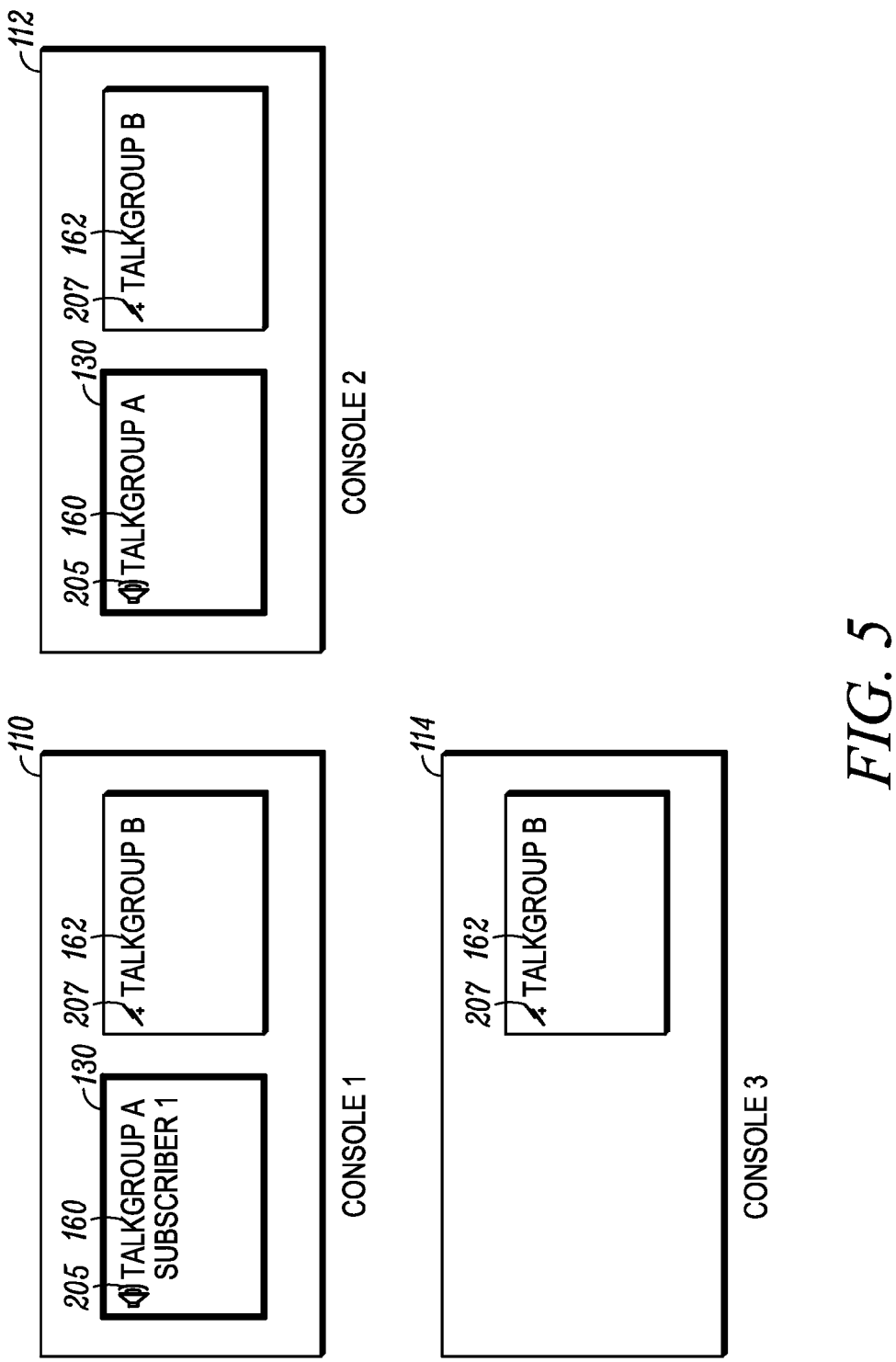

With reference to FIG. 5, if a communication-unit initiated emergency communication is present on the first talkgroup TGA 260 of the multi-talkgroup channel 106, then a cross-busy due to emergency talkgroup busy notification is received or generated at respective dispatch consoles 108 to indicate that the multi-talkgroup channel 106 is busy at the moment due to a communication-unit initiated emergency communication. Upon receiving the cross-busy due to emergency talkgroup busy notification, the respective dispatch consoles 108 display an inbound radio call indicator 205 for the first talkgroup session 160 and a cross-busy due to emergency indicator 207 for any remaining conflicting talkgroup sessions, such as second talkgroup session 162, on the multi-talkgroup channel 106. The cross-busy due to emergency indicator 207 indicates to a dispatcher at the respective dispatch console that a communication-unit initiated emergency communication is present on the multi-talkgroup channel 106 that conflicts with the talkgroup session 162 associated with the indicator 207. A communication-unit initiated emergency communication generally indicates a communication with a higher priority than a non-emergency communication-unit initiated communication. Preferably, an emergency indicator 130 is also generated for the first talkgroup session 160. An emergency indicator 130 may be displayed as a red light or red box around a talkgroup session in a display of a dispatch console 108, as shown in FIG. 5.

Figure 6:
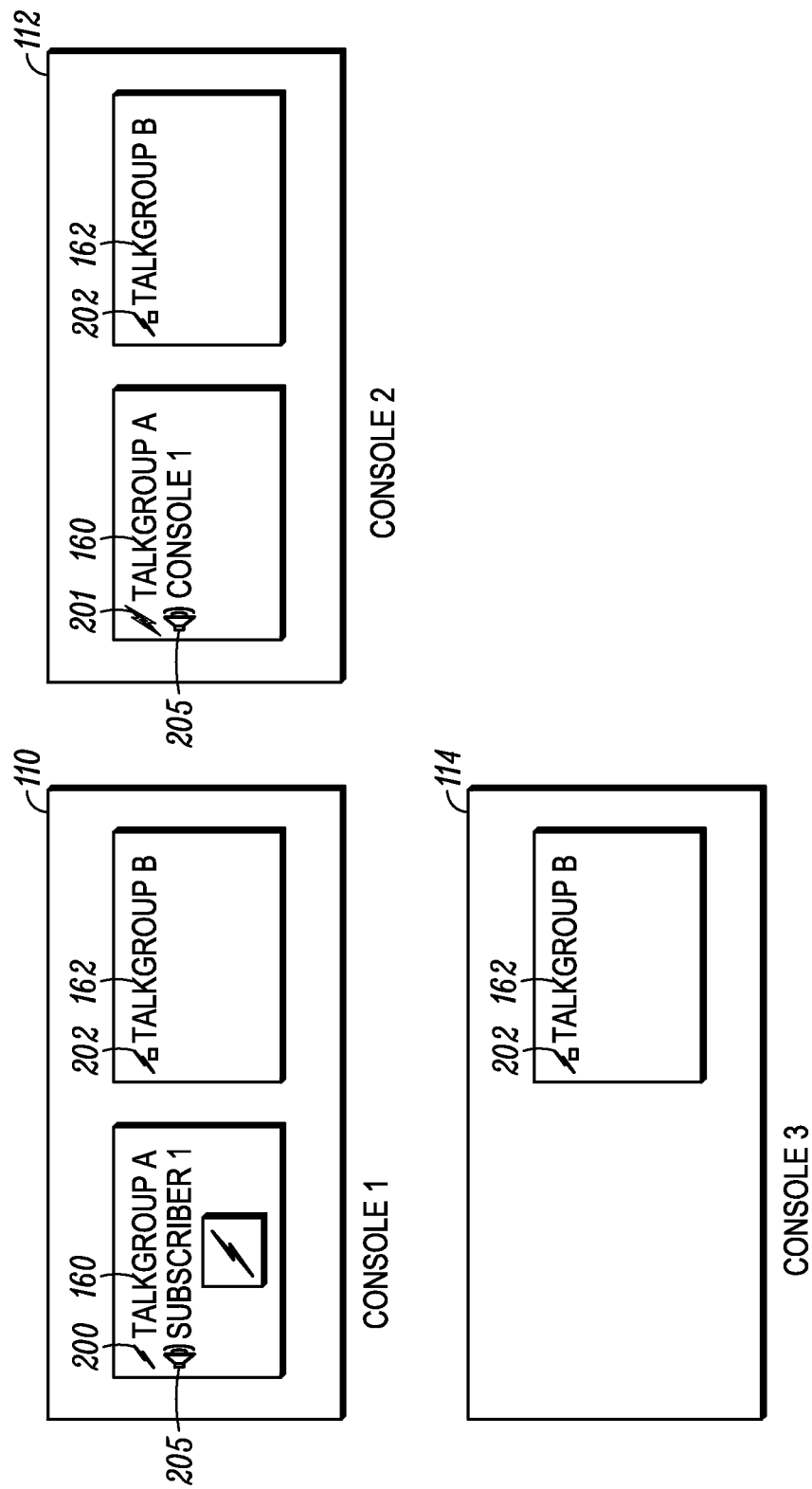

With reference to FIG. 6, if a communication-unit initiated communication is present on the first talkgroup TGA 260 of the multi-talkgroup channel 106 along with a dispatch-console-initiated communication, then a cross-buy due to console notification is received or generated at respective dispatch consoles 108 to indicate that the multi-talkgroup channel 106 is busy at the moment due to a dispatch-console-initiated communication and a communication-unit initiated communication. Upon receiving the cross-busy due to console notification, the respective dispatch consoles display an inbound radio call indicator 205 and a console busy indicator 200 or 201 for the first talkgroup session 160 and a cross-busy due to console indicator 202 for any remaining conflicting talkgroup sessions, such as second talkgroup session 162, on the multi-talkgroup channel 106. In this embodiment, both the dispatch-console-initiated communication and the communication-unit initiated communication are audible for communication devices on the first talkgroup session 160. Additionally, in one embodiment, it is possible to generate, and preferably display, both a cross-busy due to console indicator and a cross-busy due to radio indicator if a communication unit initiated communication is present on the first talkgroup TGA 260 of the multi-talkgroup channel 106 along with a dispatch-console-initiated communication.

Figure 7:
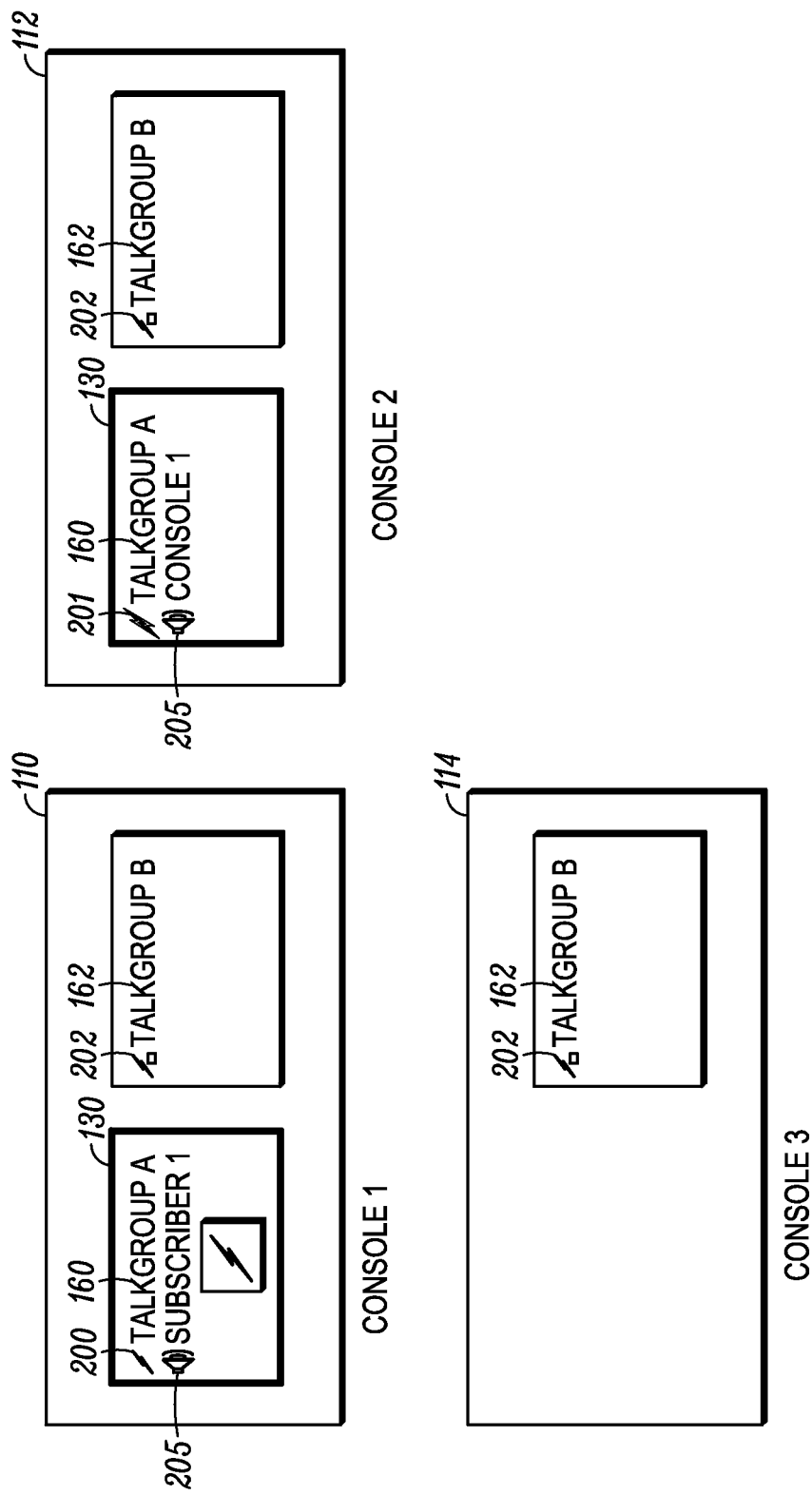

With reference to FIG. 7, if a communication-unit initiated emergency communication is present on the first talkgroup TGA 260 of the multi-talkgroup channel 106 along with a dispatch-console-initiated communication, then a cross-buy due to console notification is received or generated at respective dispatch consoles to indicate that the multi-talkgroup channel 106 is busy at the moment due to a dispatch-console-initiated communication and a communication-unit initiated emergency communication. Upon receiving the cross-busy due to console notification, respective dispatch consoles display an inbound radio call indicator 205 and a console busy indicator 200 or 201 for the first talkgroup session 160 and a cross-busy due to console indicator 202 for any remaining conflicting talkgroup sessions, such as second talkgroup session 162, on the multi-talkgroup channel 106. In this embodiment, both the dispatch-console-initiated communication and the communication unit initiated communication are audible for communication devices on the first talkgroup session 160. Preferably, an emergency indicator 130 is also generated for the first talkgroup session 160.

Notifications are signals or messages which are used by dispatch consoles within the system 100 to generate indicators associated with the notifications. Indicators are generated by dispatch consoles 108 upon receiving or generating a notification, and may be anything that can indicate or communicate information to a dispatcher, such as visual indicators displayed on a display of a dispatch console 108, audio indicators broadcast over speakers on or near a dispatch console, and mechanical or vibratory indicators generated by mechanical devices or vibrating members. A notification may be generated by the same system device (e.g., the same dispatch console) which then displays the indicator associated with the notification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing an indicator to a dispatcher of traffic on a multi-talkgroup channel, the method comprising:
   initiating and transmitting a first communication on a first talkgroup on the multi-talkgroup channel;
   receiving, at a first dispatch console, a notification indicating a presence of traffic on the multi-talkgroup channel that will conflict with a second talkgroup during the first communication, wherein the notifications includes information about a type of traffic present on the multi-talkgroup channel, wherein the first dispatch console is subscribed to participate in the second talkgroup on the multi-talkgroup channel; and generating an indicator at the first dispatch console indicating to the dispatcher the presence of traffic on the multi-talkgroup channel that will conflict with the second talkgroup during the first communication, wherein the indicator is generated based on the type of traffic present on the multi-talkgroup channel.

2. The method of claim 1, wherein the first communication is a console initiated communication initiated by any dispatch console or is a communication unit initiated communication initiated by any communication unit.

3. The method of claim 1, wherein the first communication is an emergency communication initiated by a dispatch console or a communication unit.

4. The method of claim 1, further comprising indicating to the first dispatch console that traffic from a dispatch console other than the first dispatch console is present on the multi-talkgroup channel.

5. The method of claim 1, wherein indicating to the first dispatch console is substantially concurrent with the transmission of the first communication.

6. The method of claim 1, further comprising indicating to a second dispatch console the presence of traffic conflicting with the second talkgroup on the multi-talkgroup channel during the first communication, wherein the second dispatch console is subscribed to participate in the second talkgroup on the multi-talkgroup channel.

7. The method of claim 6, further comprising indicating to the first or second dispatch console that traffic is present on the multi-talkgroup channel and that the second talkgroup should not be used to initiate and transmit a second communication on the multi-talkgroup channel.

8. A dispatch console communicatively coupled to a plurality of communication units, arranged into a plurality of talkgroups and using a single shared multi-talkgroup channel, the dispatch console configured to:
receive a notification indicating a presence of traffic on a first talkgroup on the multi-talkgroup channel, wherein the notifications includes information about a type of traffic present on the multi-group channel, wherein the dispatch console is subscribed to transmit and/or receive traffic on a second talkgroup;
determine whether the first and second talkgroups share the same multi-talkgroup channel such that the first talkgroup traffic on the multi-talkgroup channel generates a conflict with the second talkgroup; and
when it is determined that the presence of the traffic on the first talkgroup generates the conflict with the second talkgroup, generate a talkgroup busy indicator for the second talkgroup at the first dispatch console indicating the presence of traffic on the multi-talkgroup channel that conflicts with the second talkgroup, and wherein the talk-group busy indicator is generated based on the type of traffic present on the multi-talk group channel.

9. The dispatch console of claim 8, wherein the dispatch console is subscribed to transmit and/or receive traffic on the first talkgroup, and wherein the dispatch console is configured to play back audio and/or video from the traffic on the first talkgroup in addition to generate the talkgroup busy indicator for the second talkgroup.

10. The dispatch console of claim 9, wherein if the traffic is dispatch-console-initiated, indicating to the first dispatch console that dispatch-console-initiated traffic is present on the multi-talkgroup channel, and at least temporarily restraining the first communication unit from transmitting the communication on the multi-talkgroup channel.

11. The dispatch console of claim 8, wherein the dispatch console is configured to determine if the first and second talkgroups share the same multi-talkgroup channel by accessing a local cross-busy database or by receiving cross-busy information.

12. The dispatch console of claim 11, wherein the cross-busy information is encoded in the notification indicating a presence of traffic on the first talkgroup or in another signal received by the dispatch console.

13. The dispatch console of claim 8, wherein the dispatch console is configured to transmit a request to another device requesting a notification indicating a presence of traffic for any one or more conflicting talkgroups which may be in conflict with a talkgroup that the dispatch console is subscribed to transmit and/or receive traffic on, the request specifying the one or more conflicting talkgroups.

14. The dispatch console of claim 8, wherein the dispatch console is further configured to receive a notification indicating that the first talkgroup is available for transmitting a communication responsive to determining that any traffic which was present on the multi-talkgroup channel has ceased.

15. The dispatch console of claim 8, wherein the dispatch console is configured to register its preconfigured cross-busy associations to another device in a communications system in which the dispatch console is part of, prior to receiving any notification.

16. The dispatch console of claim 8, wherein different talkgroup busy indicators are generated for each of an emergency communication, a dispatch-console initiated communication, and a communication-unit initiated communication.

17. A communication system for transmitting communications on a multi-talkgroup channel comprising:
a dispatch console;
a plurality of communication units operating on a shared multi-talkgroup channel; and
a zone controller for receiving communications from, and transmitting communications between, the dispatch console and the plurality of communication units,
wherein one of the zone controller, one of the plurality of the communication units, and the dispatch console is configured to generate a notification indicating a presence of traffic on a first talkgroup on the multi-talkgroup channel when a first communication is initiated on the first talkgroup, wherein the notification includes information about a type of traffic present on the multi-group channel, wherein the dispatch console is subscribed to participate in a second talkgroup, wherein the dispatch console is configured to generate a talkgroup busy indicator indicating to a dispatcher the presence of traffic on the multi-talkgroup channel that will conflict with the second talkgroup during the first communication, if the presence of traffic on the first talkgroup generates a conflict between the first and second talkgroups, and wherein the talk-group busy indicator is generated based on the type of traffic present on the multi-group channel.

18. The communication system of claim 17, wherein the dispatch console is configured to display the talkgroup busy indicator upon receiving the notification.

19. The communication system of claim 17, wherein the dispatch console is configured to determine if the first and second talkgroups share the same multi-talkgroup channel, and if the first and second talkgroups share the same multi-talkgroup channel, traffic on the multi-talkgroup channel would generate a conflict between the first and second talkgroups.

20. The communication system of claim 17, wherein either the zone controller or the dispatch console is configured to generate a cross-busy due to console notification when traffic is generated by any dispatch console on a talkgroup other than the first talkgroup that conflicts with the first talkgroup.

21. The communication system of claim 17, wherein either the zone controller or the dispatch console is configured to generate a cross-busy due to emergency notification when emergency traffic is generated by a communication unit on a talkgroup other than the first talkgroup that conflicts with the first talkgroup.

22. The communication system of claim 17, wherein either the zone controller or the dispatch console is configured to generate a cross-busy due to radio notification when traffic is generated by a communication unit on a talkgroup other than the first talkgroup that conflicts with the first talkgroup.

* * * * *

UNITED STATES PATENT AND TRADEMARK OFFICE
CERTIFICATE OF CORRECTION

PATENT NO.        : 8,831,663 B2
APPLICATION NO.   : 13/590374
DATED             : September 9, 2014
INVENTOR(S)       : Arthur L. Fumarolo et al.

It is certified that error appears in the above-identified patent and that said Letters Patent is hereby corrected as shown below:

IN THE SPECIFICATION:

In Column 3, Line 45, delete "of communication" and insert -- of a communication --, therefor.

In Column 5, Line 20, delete "communication devices 138" and insert -- communication units 138 --, therefor.

In Column 8, Line 34, delete "indictor 202" and insert -- indicator 202 --, therefor.

Signed and Sealed this
Seventeenth Day of May, 2016

Michelle K. Lee
*Director of the United States Patent and Trademark Office*